US005891491A

United States Patent [19]
Owens et al.

[11] Patent Number: 5,891,491
[45] Date of Patent: Apr. 6, 1999

[54] USE OF DIHYDROXYQUINOLINE COMPOUNDS TO EXTEND THE SHELF LIFE OF PRODUCTS OF MAMMALS AND FISH

[75] Inventors: Frederick Newell Owens, Stillwater, Okla.; Winston A. Samuels, Chesterfield, Mo.

[73] Assignee: Solutia Inc., St. Louis, Mo.

[21] Appl. No.: 898,845

[22] Filed: Jul. 25, 1997

[51] Int. Cl.$^6$ .............................. A23K 1/00; A23B 7/10; A21D 4/00

[52] U.S. Cl. ............................. 426/2; 426/54; 426/331; 426/654

[58] Field of Search ................................. 426/2, 54, 805, 426/807, 654, 331

[56] References Cited

U.S. PATENT DOCUMENTS

| | | |
|---|---|---|
| 4,079,153 | 3/1978 | Coleman . |
| 4,087,561 | 5/1978 | Bharucha et al. . |
| 4,088,793 | 5/1978 | Bharucha et al. . |
| 4,305,932 | 12/1981 | Menachernoff et al. . |
| 4,592,915 | 6/1986 | Goyette et al. . |
| 4,871,551 | 10/1989 | Spencer . |
| 4,952,590 | 8/1990 | Von Magius ............................ 514/311 |
| 4,986,996 | 1/1991 | Barlow et al. . |
| 5,000,964 | 3/1991 | McCauley, III . |
| 5,066,498 | 11/1991 | McCauley, III . |
| 5,167,835 | 12/1992 | Harder . |
| 5,282,379 | 2/1994 | Harder et al. . |
| 5,348,755 | 9/1994 | Roy ........................................... 426/49 |
| 5,656,319 | 8/1997 | Barclay .................................... 426/574 |
| 5,698,244 | 12/1997 | Barclay ..................................... 426/2 |

FOREIGN PATENT DOCUMENTS

| | | |
|---|---|---|
| 943962 | 3/1974 | Canada . |
| 944135 | 3/1974 | Canada . |
| 2087792 | 1/1993 | Canada . |
| 0466674 A1 | 7/1991 | European Pat. Off. . |
| 2513491 | 9/1981 | France . |
| 1356002 | 8/1971 | United Kingdom . |
| 1440183 | 7/1972 | United Kingdom . |
| 1444024 | 7/1973 | United Kingdom . |
| 1537334 | 3/1976 | United Kingdom . |

OTHER PUBLICATIONS

Dunkley et al., Supplementing Rations With Tacopherol And Ethoxyquin To Increase Oxidative Stability Of Milk, *J. Dairy Science*, 50(4):492–499.

Dunkley et al., Compounds In Milk Accompanying Feeding Of Ethoxyquin, *J. Dairy Science*, 41(8):1215–1218.

Packer et al., Handbook Of Synthetic Antioxidants, (Brochure).

Packer et al., Handbook Of Antioxidants, (Brochure).

McCauley, Nutritional Supplement Compns. For Hoof And Coat—Comprises Methionine, Biotin, Yeast, Solubles, Chelated Zinc And Opt. Carrier, Preservative, Antioxidant And Flavour (Abstract Only).

McCauley, Treatment Of Hoof And Coat Ailments In Animals—By Admin. Of A Supplement Comprising Carrier, Di–Methionine, Yeast Culture And Zinc Methionine etc. (Abstract Only).

Barlow et al., Stabilisation Of Natural Or Processed Oils—By Addn. Of 8–Substd–Ethoxyquin Analogues Which Do Not Dimerise On Oxidn. (Abstract Only).

Tobey, Stabilising Feedstuff Against Oxidn. And Mound Growth—Using Mixt. Of 2,2,4–Tri Methyl 1,2–Di Hydro Quinoline Cpd. (Pref. Exthoxyquin), Sorbic Acid And Opt. Propionate Salt (Abstact Only).

Vonmagius, New Ethoxyquin Salts With Carboxylic Acids—Useful As Antioxidants For Fruit Scab Control (Abstract Only).

Author Unknown, Curing Meats Prepd. At High Temps. Prior To Consumption—Using Alkali Metal Nitrite and (1,2)—Dihydroquinone (Abstract Only).

Author Unknown, Meat–Curing Solns. Contg. (1,2,3,4)—Tetrahydro (6)—Alkoxy Quinolines—Which Reduce Nitrosamine Content Of The Cooked Meat (Abstract Only).

Bharucha et al., Control Of Nitrosamine Formation In Cured Meat—Using Nitroxide Derivs. of 1,2—Di Hydro– And 1,2,3,4—Tetra Hydro–6–Alkoxy–Quinoline Cpds. (Abstract Only).

Author Unknown, Antioxidant For Oil And Fat Used In Foodstuff—Comprises Gallic Acid And L–Ascorbic Acid (Abstract Only).

Yeo, Cattle Fodder—Contains Source of N–3 Fatty Acid, Carbohydrate, Emulsifier Hay And Antioxidant, Giving Meat Enriched In N–3 Fatty Acid (Abstract Only).

Monroy, Alkyldihydroquinolines—Antioxidants And Parasiticides Eg For Foods (Abstract Only).

Colelman, 6–Alkoxy–1,2–Di Hydro–Quinoline(s)—For Reducing Nitrosamine Prodn. In Heated Nitrite–Treated Cured Meats (Abstract Only).

Passwater, Anticarcinogenic Food Supplements—Contg. Antioxidants And S–Contg Amino Acids (Abstract Only).

Author Unknown, Cured Meats Contg. Nitrite And Ethoxyquin—Are Less Prone To Carcinogen Formation On Subsequent Cooking (Abstract Only).

Author Unknown, Pig food Including Vitamin E—And Poly Unsatd Acids Counteracting Danger From Oxidised Lipids (Abstract Only).

Shermer, Antioxidant Compsns. Esp. For Fats And Oils—Contg. Ethoxyquin And Phosphoric Acid (Abstract Only).

(List continued on next page.)

*Primary Examiner*—Nina Bhat
*Attorney, Agent, or Firm*—Howell & Haferkamp, L.C.

[57] ABSTRACT

The shelf life of a meat product derived from an animal selected from the group consisting of ruminant mammals, swine and fish is extended by feeding to the animal a diet of feed comprising a substituted 1,2-dihydroquinoline compound, the diet being continued for a period of time, and the feed comprising the substituted 1,2-dihydroquinoline compound in an amount, sufficient to increase the shelf life of the meat product.

52 Claims, No Drawings

OTHER PUBLICATIONS

Nicholson et al., Effect Of Mash Or Pelleted Supplements Containing Crab Meal On Intake And Weight Gains Of Beef Cattle, *Canadian Journal of Animal Science*, 76(1): 95–103, (1996) (Abstract Only).

Herrick, Feed Additives And Their Uses In Cattle, *Feedstuffs*, USA, 44(43):A20–A22, (1972) (Abstract Only).

Smekalov et al., Use Of Meat Factory By–Products In Whole Milk Substitutes For Calaves, *Zhivotnovodstvo*, 11:52–54, (1979) (Abstract Only).

Lauridsen et al., Comparative Sudies On The Effect Of Butylhydroxy–Toluene And Ethoxyquin On The Antioxidative And Oxidative Balance In Broilers, *J. Anim. Physiol. Anim. Nutr.*, 72(1):26–37, (1994) (Abstract Only).

Gatlin III et al., Effects Of Dietary Vitamin E And Synthetic Antioxidants On Composition And Storage Quality Of Channel Catfish, Ictalurus Punctatus, *Aquaculture*, 106(3–4):323–32, (1992) (Abstract Only).

Bartov et al., Effects Of High Concentrations Of Dietary Vitamin E And Ethoxyquin On The Performance Of Laying Hens, *Br. Poult. Sci.*, 32(3):525–34, (1991) (Abstract Only).

Huang et al., Effect Of Dietary Fish Oil On Omega –3 Fatty Acid Levels In Chicken Eggs And Thigh Flesh, *J. Agric. Food Chem.*, 38(3):743–7, (1990) (Abstract Only).

Bharucha et al., Nitroxides Derived From Ethoxyquin And Dihydroethoxyquin As Potent Antinitrosamine Agents for Bacon, *J. Agric. Food Chem.*, 35(6):915–917, (1987) (Abstract Only).

Shahidi et al., Control Of Lipid Oxidation In Cooked Ground Pork With Antioxidants And Dinitrosyl Ferrohemochrome, *J. Food Sci.*, 52(3):564–7, (1987) (Abstract Only).

Bharucha et al., P–Alkoxyanilines As Antinitrosamine Agents For Bacon, *J. Agric. Food Chem.*, 34(5):814–818, (1986) (Abstract Only).

Bartov et al., Effect Of Dietary Vitamin E On The Stability And Sensory Quality of Turkey Meat, *Poult. Sci.*, 62(7):1224–30, (1983) (Abstract Only).

Bartov et al., Stability Of Abdominal Fat And Meat Of Broilers: Combined Effect Of Dietary Vitamin E And Syntheitc Antioxidants, *Poult. Sci.*, 60(8):1840–5, (1981)(Abstract Only).

Bartov et al., Stability Of Abdominal Fat And Meat Of Broilers: Effect Of Duration Of Feeding Antioxidants, *Br. Poult. Sci.*, 19(1):129–35, (1978) (Abstract Only).

Bartov, Lack of Effect of Dietary Ascorbin Acid On Stability Of Carcass Fat And Meat Of Broilers, *Br. Poult. Sci.*, 18(5):553–555, (1977) (Abstract Only).

Bartov et al., Stability Of Abdominal Fat And Meat Of Broilers: Relative Effects Of Vitamin E, Butylated Hydroxytoluene And Ethoxyquin, *Br. Poult. Sci.*, 18(1):59–68, (1977) (Abstract Only).

Dahle et al., Gas Chromatographic Deteremination Of Ethoxyquin In Feed And Food Products. II, *J. Agric. Food Chem.*, 23(6):1093–1095, (1975) (Abstract Only).

Evtimova et al., Effect Of Feed Mixtures With Stabilized And Nonstabilized Animal Fat Used After Storage, For Fattening Pigs, *Zhivotnovud, Nauki*, 12(3):48–55, (1975) (Abstract Only).

Webb et al., Effects Of Feeding Antioxidants On Rancidity Development In Pre–cooked, Frozen Broiler Parts, *Poult. Sci.*, 51(5):1601–5, (1972) (Abstract Only).

King et al., .Alpha.–Tocopherol, .Beta.–Carotene And Ascorbic Acid As Antioxidants In Stored Poultry Muscle, *J. Food Sci.*, 60(5):1009–12, (1995) (Abstract Only).

Shahidi et al., Evaluation Of Malonaldehyde As A Marker Of Oxidative Rancidity In Meat Products, *J. Food Biochem.*, 15(2):97–105, (1991) (Abstract Only).

Bharucha et al., Ethoxyquin, Dihydroethoxyquin, And Analogs As Antinitrosamine Agents For Bacon, *J. Agric. Food Chem.*, 33(5):834–9, (1985) (Abstract Only).

Pikul et al., Effect Of Antioxidants On The Stability Of Mechanically Deboned Frozen Poultry Meat, *Fleischwirtschaft*, 63(5):960–964, (1983) (Abstract Only).

Jasiunas, Use Of Antioxidants In Feed Mixes For Meat––Poultry, *Nauch. Tr. Pribalt. Zonal. Opyt. St. po Ptitsevod.*, (8):52–5, From: Ref. Zh., Zhivotnovod. Vet. 1984, Abstr. No. 458614, (1983) (Abstract Only).

Combs et al., Influence Of Selenium, Vitamin E, And Ethoxyquin On Lipid Peroxidation In Muscle Tissues From Fowl During Low Temperature Storage, *Poult. Sci.*, 59(2):347–351, (1980) (Abstract Only).

Dvinskaya et al., Content Of Ethoxyquin In Chick Tissues, *Veterinariya*(Moscow), 11:73–4, (1979) (Abstract Only).

Bartov et al., Nutritional Factors Affecting The Carcass Quality Of Broilers, *Proc.– Ga. Nutr. Conf. Feed Ind.*, 44–55, (1979) (Abstract Only).

Coleman, A Model System For The Formation Of N–Nitrosopyrrolidine In Grilled Or Fried Bacon, *J. Food Technol.*, 13(1):55–69, (1978) (Abstract Only).

Dvinskaya, Effect Of Qualitatively Different Fats, .Alpha.–Tocopherol, And Antioxidants On Morphofunctional Changes In Tissues, Vitamin Requirement And Productivity Of Broiler Chicks, *Tr. Vses. Nauchno–Issled. Inst. Fiziol., Biokhim, Pitan. S–kh. Zhivotn.*, 17:134–49, (1977) (Abstract Only).

Piul'skaya et al., Oxidative Changes Of Meat–Bone Meal During Storage And The Effect of Antioxidants, *Tr., Vses. Nauchno–Issled. Inst. Myasn. Prom–Sti.*, 39:3–9, (1977) (Abstract Only).

Kanid'ev et al., First Soviet Polybitamin Premix For Trout, *Rybn. Khoz.* (Moscow), 11:12–14, (1976) (Abstract Only).

Peterson et al., Vitamin E And Fishy Off–Flavors In Turkey Meat, *Qual. Poult. Meat, Proc. Eur. Symp.*, 2nd(31A):8, (1975) (Abstract Only).

Katkevicius et al., Effect Of Different Doses Of The Antioxidant Diludin On the Growth Of Meat Pullets, *Kompleksn. Ispol'z. Biol. Akt. Veshchestv Korml. S–kh. Zhivotn., Mater. Vses. Soveshch.*, 1st Meeting Date 1973, 390–4. Editor(s): Solntsev, K.M. Publisher: Beloruss. S–kh. Akad., Gorki, USSR, (1974) (Abstract Only).

Grigorov et al., Effect Of Santoquin On the Preservation Of Carotene In A Microbial Preparation, *Zhivotnovodstvo*, (12):48–49, (1974) (Abstract Only).

Piul'skaya et al., Use Of Santoquin–Stabilized Meat–And–Bone Meal In The Feeding Ration Of Pigs, *Tr., Vses. Nauchno–Issled. Inst. Myasn. Prom–sti.*, 29:43–6 Coden: TVMYAE, (1974) (Abstract Only).

Kogan, Effect Of Vitamin E, Santoquin, And Sodium Selenite On Broiler Performance, *Aktual. Probl. Razvit. Ptitsevod.*, 6:162–169, (1973) (Abstract Only).

Astrup, Vitamin E And The Quality Of Pork, *Acta Agr. Scand., Suppl.*, 19:152–7, (1971) (Abstract Only).

Kirkland et al., Effect Of Ethoxyquin On The Chemical And Nutritional Changes Of Poultry By–Product Meal And Poultry Offal Fat During Storage, *Poultry Sci*, 50(1):137–43, (1971) (Abstract Only).

Opstvedt et al., Influence Of Residual Lipids On The Nutritive Value Of Fish Meal. III. Antioxidant–Stabilized And Solvent–Extracted Fish Meal In Diets For Broiler Chickens With Different Levels Of Added Vitamin E And 6–Ethoxy–1, 2–Dihydro–2, 2,4–Trimethylquinoline, *Acta Agr. Scand.*, 21(2):125–43, (1971) (Abstract Only).

Spruzs, Stabilizing Effect Of Ethoxyquin And Diludine On The Carotene In Grass Meal And Mixed Feed, *Regul. Rosta Metab. Zhivotn.*, 111–24. Editor(s): Valdmanis, A. Publisher: "Zinatne", Riga, Latv. SSR, (1971) (Abstract Only).

Totev et al., Preservation Of Pork Cracklings Stabilized With Antioxidants, *Zhivotnovud. Nauki*, 8(5):55–61, (1971) (AbstractOnly).

Zabara, Enrichment Of The Rations Of Young Hogs With Stabilized Caroten Of Grass Meal, *Svinovodstvo (Kiev)*, 15:35–40, (1971) (Abstract Only).

Opstvedt et al., Influence Of Residual Lipids On The Nutritive Value Of Fish Meal. II. Effects On Carcass Composition And Organoleptic Quality Of Different Levels Of Antioxidant Stabilized And Unstabilized Fish Meal In Broiler Diets With And Without Added Vitamin E, *Acta Agr. Scand.*, 20(3):185–93, (1970) (Abstract Only).

Spruzs, Effectiveness Of Mixed Feed With Carotene–Stabilized Grass Meal In Bacon Pig Fattening, *Nauke—Zhivotnovod*, (8):109–15, (1970) (Abstract Only).

Kirkland et al., Effect of Ethoxyquin On The Nutritional Value Of Animal Byproducts, *Feedstuffs*, 42(11):17–18, 20, (1970) (Abstract Only).

Van Deren et al., Collaborative Study Of The Determination Of Ethoxyquin In Chick Tissue And Eggs By Fluorescence, *J. Assoc. Offic. Anal. Chem.*, 51(3):537–9 (1968) (Abstract Only).

Van Deren et al., Collaborative Study Of The Determination Of Ethoxyquin In Chick Tissue And Eggs, *J. Assoc. Off. Anal. Chem.*, 50(4):844–7, (1967) (Abstract Only).

Neudoerffer et al., Effects Of Dietary Polyunsaturated Fatty Acids On The Composition Of The Individual Lipids Of Turkey Breast And Leg Muscle, *Br. J. Nutr.*, 21(3):691–714, (1967) (Abstract Only).

Loury et al., Prevention Of Fat Oxidation. IV. Conservation Of Suets Subsequently Used In The Preparation Of Artificial Milk, *Rev. Fr. Corps Gras*, 14(11):645–7, (1967) (Abstract Only).

Synowieszki et al., Effect Of An Antioxidant On The Stability Of Vitamin A In Mineral–Vitamin Preparations And Concentrates Forming Part Of Feed Mixtures, *Med. Welt*, 23(9):523–5, (1967) (Abstract Only).

Sathe et al., Nutritional Evaluation Of Meat Meals For Poultry. V. Effect Of Addition Of Antioxidants During And After Processing On Growth–Promoting Value Of High And Low Quality Meat Meals, *Aust. J. Agric. Res.*, 18(1):183–91, (1967) (Abstract Only).

Javeed Ahmed et al., Growth And Meat Quality Of Broiler Chicks Fed With Fermented Fish Viscera Silage, *International Journal Of Animal Sciences*, 11(1):1–5. 19 ref. (1996) (Abstract Only).

Kobakhidze et al., Therapeutic And Prophylactic Feed Preparation For Broiler Chicks, *Farmakologicheskie I Toksikologicheskie Aspekty Promyshlennogo Zhivotnovodstva* 68–70. Sbornik Nauchnykh Trudov Moskovskoi Veterinarnoi Akademii, (1985) (Abstract Only).

Hobson–Frohock, Residues of Ethoxyquin In Poultry Tissued And Eggs, *Journal Of The Science Of Food And Agriculture*, 33(12):1269–1274, 10 ref, (1982) (Abstract Only).

Karadzhyan et al., Effect Of Some Antioxidants On Egg Yield Of Hens And Lipid Content Of Their Tissues, *Trudy Erevanskogo Zootekhnichesko–Veterinarnogo Institute*, 50:172–176, (1981) (Abstract Only).

Zhekhov et al., Study On The Biological Activity Of Vitamin E In Forage Mixtures Of Different Santoquin Content, Prouchvaniya V"Rkhu Biologichnata Aktivnost Na Vitamin E V"V Furazhni Smeski S Razlichno S"d"rzhanie Na Santokvin, *Veterinarnomeditsinski Nauki*, 18(1):77–83 15 ref, (1981) (Abstract Only).

Bartov, Pro–And Antioxidants In The Diets Of Broilers And Their Effect On Carcass Quality: Copper, Selenium And Acidulated Soybean–Oil Soapstock, *Poultry Science*, 56(3):829–835, (1977) (Abstract Only).

Spruzh, Diludin And Santoquin For Fattening Pigs, *Svinovodstvo, Moscow, USSR*, (2):18–19, (1975) (Abstract Only).

Kogan, Vitamin E And Santoquin for Rearing Broilers, *Khimiya V Sel'Skom Khozyaistve*, 11(6):462–463, ISSN: 0023–1185,(1973) (Abstract Only).

Atkinson et al., Flavour Studies With Different Levels And Times Of Fish Meal Feeding And Some Flavour–Imparting Additives In Broiler Diets *Agroanimalia*, 4(2):53–61, (1972) (Abstract Only).

Layug et al., The Effect Of A High Level Of Ethoxyquin On The Nutritive Value And Pigmenting Potency Of Alfalfa Leaf Extracts, *Univ. Farm, Sch. Of Agric. Sci., Nagoya Univ., Togo–Cho, Aichi–Ken*, 470–01, Japan (Abstract Only).

Combs et al., Influence Of Selenium, Vitamin E, And Ethoxyquin On Lipid Peroxidation In Muscle Tissues From Fowl During Low Temperature Storage, *Poultry Science*, 59(2):347–351, 26 ref, (1980) (Abstract Only).

Sirbu et al., Effect Of Some Premix Recipes With Different Vitamin Contents On Egg And Meat Production Of Meal–Line Hens, *Lucrarile Stiintifice Ale Institutului de Cercetari Pentru Nutritia Animalelor*, 5:201–209, 26 ref, (1976) (Abstract Only).

Kronka et al., Beef Tallow In Pig Feeding And Its Effects On Growth, Carcass Quality And Chemical Composition Of Backfat, *Cientifica*, 2(2):189–197, 20 ref (1974) (Abstract Only).

Rojas et al., Effects Of Peruvian Anchovy (Engraulis Ringens) Meal Supplemented With Santoquin On Growth And Fishy Flavour Of Broilers, *Poultry Science*, 48(6):2045–52, 23 ref, (1969) (Abstract Only).

Janssen et al., Gizzard Erosion Meat Flavor And Vitamin E In Broilers, *Acta Agric Scand Suppl*, 19:72–78, (1973) (Abstract Only).

Lauridsen et al., Effects Of Synthetic Antioxidants in Feed Of Different Technological Treatments On The Performance Of Broilers, *Royal Vet & Agr Univ, Dept Anim Sci & Anim Hlth, Bulowsvej 13, DK–1870 Frederiksberg C, Denmark*, (Reprint) (Abstract Only).

Christmas et al., The Performance Of Commercial Broilers when Fed Various Levels Of Rendered Whole–Hen Meal, *Poultry Science*, 75(4):536–539, Publisher: Savoy, II: *Poultry Science Association, Inc.*, (1996) (Abstract Only).

Huang et al., Effect Of Dietary Fish On Omega–3 Fatty Acid Levels In Chicken Eggs And Thigh Flesh, *Journal of Agricultural And Food Chemistry*, 38(3):743–747, (1990) (Abstract Only).

Combs, et al., Influence Of Selenium, Vitamin E, And Ethoxyquin On Lipid Peroxidation In Muscle Tissues From Fowl During Low Temperature Storage (Rancidity In Frozen Poultry, Meat), *Poultry Science*, 59(2):347–351 III, (1980) (Abstract Only).

USE OF DIHYDROXYQUINOLINE COMPOUNDS TO EXTEND THE SHELF LIFE OF PRODUCTS OF MAMMALS AND FISH

BACKGROUND OF THE INVENTION (1) Field of the Invention

The present invention relates to techniques for improving the quality of meat products derived from certain animals, namely ruminant mammals, swine and fish, and more particularly to extending the shelf life of such products by supplementing the diets of such animals.

(2) Description of the Prior Art

Many meat products derived from ruminant mammals (such as, cattle and sheep), swine and fish have very limited shelf lives. After a relatively short period of time, the meat may turn color and become rancid (that is, develop an unacceptable smell or flavor or both). In short, it spoils. Shelf life for beef is typically measured as the length of time for the meat, in plastic trays, overwrapped with an oxygen-permeable polyvinyl chloride film, and displayed under fluorescent lighting (150 foot candles) at 4° C., to discolor; to turn brown or grey. This definition will be used herein to apply to other meat products as well.

By this measure, shelf life for beef, even if sealed from exposure to air, is about seven days from slaughter, after which it may turn from red to brown or grey and spoil. And, as limited as this shelf life is, because of shipping delays, less than ideal storage conditions and increased surface area resulting from cutting the meat into steaks, the typical marketable life of steak in the display case is substantially shorter—closer to twelve hours. Moreover, while the quality and freshness of steak or other meat is commonly evaluated by the color of the meat, color is not a reliable indicator of quality or freshness. Meat can turn brown or grey significantly prior to spoilage. Thus, large quantities of high quality, fresh meat becomes unmarketable and thus is wasted because of deceptively premature color change.

The resulting food waste and loss from spoilage associated with shelf life limitations amounts to billions of dollars in the U.S. alone. In fact, it has been estimated that increasing shelf life of beef in the supermarket by just two days could save the U.S. beef industry up to $175 million through increased beef sales. See Schaefer et al., Proc. Holstein Beef Prod. Symposium (1991), p. 175. The total value to the U.S. beef industry of increasing the shelf life of beef by just one to two days has been estimated at $1 billion. Hill, Ga. Stocker-Finnisher Conference (1992).

Thus, many efforts have been made toward increasing the shelf life of beef. Often the efforts have involved direct treatment of the beef, for example, with preservatives.

Other efforts, however, have been directed to treatment of the cattle themselves, such as supplementing their diets with chemical additives. With respect to cattle treatment by dietary intervention, research from the Universities of Wisconsin and Georgia indicates that adding 1200 to 1300 IU Vitamin E daily (100 ppm alpha-tocopherol acetate in the feed) to the diet of feedlot cattle extends the shelf life of several cuts of beef from a maximum of about seven days to about fourteen days or more. Williams et al., California Nutrition Conference (1993), pp. 23–42. It is believed that the Vitamin E increases the shelf life of beef—that is, maintains the meat color—by retarding the aging process by which metmyoglobin gradually replaces the red oxymyoglobin, causing the meat to become brown.

However, the cost of this Vitamin E supplement is about 1.5 cents per animal a day, or $2.50 additional cost per animal. Because this cost is not recovered directly by the producer, it can be prohibitive. Nevertheless, completely satisfactory alternative dietary supplements are unknown. In fact, dietary techniques face long odds of success, at least in part with respect to ruminant mammals because many dietary ingredients are extensively destroyed during passage through the rumen. Even measurements with various commercial sources of Vitamin E indicated that intestinal availability was only 36 to 52% of that being fed. Shin and Owens, Ok. State Univ. Animal Research Report, 154–158 (1990). Because shelf life extenders are so beneficial and alternatives are so limited, the use of Vitamin E is increasing dramatically despite its cost.

Although the addition of 6-ethoxy-1,2-dihydro-2,2,4-trimethylquinoline (commonly referred to as "ethoxyquin") to animal feeds as a dietary supplement to improve the shelf life of food products derived from animals consuming the feeds has nowhere even been suggested in the current art, its use as a feed ingredient for various reasons is well known. For example, because ethoxyquin is an antioxidant, it has been added to certain animal feeds to preserve the feed itself; that is, to prevent the feed constituents from spoiling. See, for example, U.S. Pat. Nos. 5,066,498 and 5,000,964, both to McCauley, III, which teach the use of up to 1.5% Santoquin® (an ethoxyquin composition sold by Monsanto, Co.) to prevent oxidation and breakdown of certain components of a horse feed composition designed for treatment of the horsels hooves and coat. However, it is not clear that this use in feeds has resulted in ingestion of the ethoxyquin by the animals. It is reported in the background section of U.S. Pat. No. 4,986,996 to Barlow et al., that although ethoxyquin has been widely approved for use in animal feed and is the most commonly used anti-oxidant in fish meal intended for that use, within hours of the addition of the ethoxyquin to the feed, analyses of the feed no longer detect any trace of ethoxyquin. On the other hand, when ethoxyquin is ingested, tissue levels of ethoxyquin have been found to be similar whether calves had developed their rumen or not. deMille et al., Can. J. Anim. Sci. 52:351–361 (1972). Thus, even though many dietary ingredients are extensively destroyed during passage through the rumen, research to date suggests that ethoxyquin is not destroyed in the rumen. Indeed, it has been reported that addition of ethoxyquin to diets of dairy cattle has resulted in the appearance of ethoxyquin in the fat of the resulting milk. Dunkley et al., Supplementing Rations with Tocopherol and Ethoxyquin to Increase Oxidative Stability of Milk, J. Dairy Sci., Vol. 50, No. 4, pp. 492–499 (1967); Dunkley et al., Compounds in Milk Accompanying Feeding of Ethoxyquin, J. Dairy Sci., Vol. 51, No. 8, pp. 1215–1218 (1968).

Ethoxyquin also has been reported to have been used in a concentration of 0.05 to 0.1% (500–1,000 ppm) in a feed composition for breeding cattle with N3 fatty acid-accumulated beef. See Canadian Patent No. 2,087,792. According to page 10 of that Canadian patent, the ethoxyquin is used as an anti-oxidant and "also plays an anti-oxidation activity in the cattle's body, as well as in the feed composition, to prevent the oxidative decomposition of N3 fatty acid in spoilage of feed during long-term storage." And, in U.K., Patent No. 144,024, the possible candidacy of ethoxyquin as an anti-oxidant component of a food or feed supplement to prevent the occurrence of or to retard cancer is reported. It is suggested there that the ethoxyquin concentration should be sufficient for the daily consumption to be about 0.01 to 500 mg.

Dietary ethoxyquin also has been applied to animals other than cattle. For example, it has been reported to reduce or to prevent certain maladies associated with a deficiency of Vitamin E, in particular, encephalomalacia, exudative diathesis in chicks, muscular dystrophy in chicks and lambs and fetal resorption in rats. It is unclear whether these effects have been direct effects on the target tissues or indirect effects through preventing lipid oxidation and reducing Vitamin E usage or by preventing Vitamin E destruction in the diet or the gut. Miller and White, Nutr. Rep. Int. 12:245–252 (1975); Whanger et al., Nutr. Rep. Inst. 13:159–173 (1976). However, dietary ethoxyquin has been reported to prevent lipid oxidation in muscle tissues in broilers and layers. Bartov and Bornstein, Br. Poultry Sci. 18:59–68 (1977); Combs and Regenstein, Poultry Sci. 59:347–351 (1980). The ethoxyquin concentration in the feed in the broiler study was 75 to 150 ppm by weight, and 150 ppm of ethoxyquin was found to be as effective as about 15 ppm alpha-tocopherol acetate. In the layer study, the ethoxyquin concentration was 500 ppm. Ethoxyquin was detected in the muscle tissue of poultry and lambs, suggesting that the effect is directly in the tissue. demille et al., Can. J. Anim. Sci. 52:351–361 (1972).

Despite these reports of uses of ethoxyquin in feed, there is no indication that the ethoxyquin has had any effect on the shelf life of meat products derived from the animals. In fact, ethoxyquin has been reported to be a direct food additive, but even that has been for purposes other than to increase shelf life of the food. For example, U.S. Pat. No. 4,079,153 to Coleman, U.S. Pat. No. 4,087,561 to Bharucha and Coleman and U.S. Pat. No. 4,088,793 to Bharucha, Rubin and Cross disclose methods for reducing formation of nitrosamines by applying ethoxyquin directly to the meat.

Thus, the livestock industry and particularly the cattle industry, is still searching for inexpensive and simple techniques for extending the shelf life of animal-derived food products, such as beef and milk.

Moreover, it is noteworthy that these industries encounter several other problems as well and if a further benefit of the shelf life treatment is to alleviate some of these problems as well, the value of the treatment would be enhanced even more. Among these problems may be noted the offensive odor associated with animal waste (e.g., cattle manure). In addition, cattle and sheep, in particular, have been afflicted with high rates of liver abscesses. Commercially, about 15–30% of livers from feedlot cattle are discarded, primarily due to presence of abscesses. Thus, a method that reduces the incidence of liver abscesses or lessens their severity also would be beneficial. In fact, it has been reported that in a small study 2,000 ppm ethoxyquin appeared to increase rate of liver regeneration in rats by 26 to 34%. See Gavino et al., Life Sci. 36:1771–1777 (1985). Also, meat from younger animals is typically more desirable than that from older animals. Therefore, a technique that can delay the maturity of an animal or at least the apparent maturity, would be desirable as well. In addition, a certain percentage of beef is dark in color initially and therefore becomes unmarketable regardless of its age. As a result, that percentage is simply waste. Thus, methods for reducing the incident of dark color beef would be desired as well. Finally, of course, faster and more efficient weight gain rates are always desirable.

SUMMARY OF THE INVENTION

The present invention, therefore, is directed to a novel method for extending the shelf life of a meat product derived from ruminant mammals, swine and fish. According to the method, the animal is fed a diet of feed comprising a substituted 1,2-dihydroquinoline compound. The diet is continued for a period of time, and the feed comprises the substituted 1,2-dihydroquinoline compound in an amount, sufficient to increase the shelf life of the food product.

The present invention is also directed to meat products of enhanced shelf life prepared by such method.

Among the several advantages of this invention, may be noted the provision of a method for extending the shelf life of meat products; the provision of such method that involves merely simple, inexpensive and effective dietary treatment of the animals from which the products are derived; and the provision of such method that provides ancillary benefits as well.

DETAILED DESCRIPTION OF THE PREFERRED EMBODIMENTS

In accordance with the present invention, it has been discovered that the simple and relatively inexpensive incorporation of a substituted 1,2-dihydroquinoline compound into the diet of certain animals, particularly, ruminant mammals such as cattle and sheep, swine and fish, substantially increases the shelf life of the meat products derived from them. Moreover, the treatment of this invention has been found to provide several other benefits as well. For example, it also has been found that, surprisingly, the treatment appears to retard the aging process of the animal as well. As a result, the most desirable beef, i.e., youthful, lean-colored beef, may be obtained from cattle that otherwise are too old to be a source of such beef. Another surprising effect that has been discovered is a marked reduction in the offensive odor associated with the excretions of the cattle or other animals upon initiation of the treatment of this invention. In addition, it appears that the treatment of this invention also reduces the incidence of and/or lessen the severity of liver abscesses in the animals, particularly cattle, that are subjected to the treatment. Not only that, but the treatment of the invention has been found to reduce the incidence of dark color beef as well. And significantly—and surprisingly—the treatment has been found to lower the feed intake rate, while at the same time increase the weight gain rate of the animal despite the lower food intake. Feed efficiency is therefore enhanced.

In particular, the treatment of this invention may be applied to ruminant mammals, such as cattle and sheep, to swine and, to fish. Of these animals, the treatment is most particularly designed for ruminant mammals and swine, especially ruminant mammals. Of the ruminant mammals, the treatment is envisioned as having greatest application to cattle, primarily cattle to be used for beef.

According to the treatment, the animal is fed its standard feed, except that a substituted 1,2-dihydroquinoline compound has been added to it. The substituted 1,2-dihydroquinoline compound corresponds to the formula

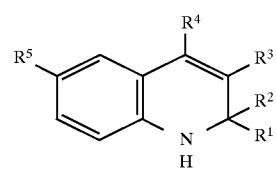

wherein $R^1$, $R^2$, $R^3$, and $R^4$ are independently selected from hydrogen and alkyl groups of from 1 to about 6 carbon atoms, preferably from 1 to four carbon atoms, and $R^5$ is an alkoxy group of from 1 to about 12 carbon atoms, preferably from 1 to four carbon atoms. The most preferred 1,2- dihydroquinoline is 6-ethoxy-1,2-dihydro-2,2,4-trimethylquinoline, commonly known as "ethoxyquin." Ethoxyquin is a well known compound, as discussed above, and is readily available. For example, one form is sold under the trademark SANTOQUIN®. The ethoxyquin may be added in wet or dry form. For the sake of brevity, the following description of the method of this invention will refer specifically to ethoxyquin, but it should be understood that it is believed that the method may be generalized to the other 1,2-dihydroquinolines defined above as well.

Because ethoxyquin may tend to oxidize over time upon exposure to the other feed constituents, it is preferred that it be added to the feed shortly before the animal feeding, preferably within a day of feeding, more preferably within two hours of feeding. And, whereas conventional use of ethoxyquin to prevent rancidity or spoilage of the feed itself involved addition of the ethoxyquin only to the fat or tallow ingredients of the feed, such as fish meal, in the present method, ethoxyquin is added even to the non-fat ingredients of the feed. While the ethoxyquin might be present in less than all the ingredients initially, it is desired that the ethoxyquin be dispersed through all the ingredients of the finished feed. This addition may be in combination with the mixing together of the feed ingredients to form the feed, or after the mixing of the after ingredients. In the former case, the ethoxyquin may be simply mixed in as another feed ingredient. In the latter case, the ethoxyquin may be sprayed on the feed mixture, for example, if the ethoxyquin is in liquid form, or mixed into the feed mixture.

The ethoxyquin should be incorporated into the feed in an amount sufficient, that when fed to the animal for the desired length of time, the shelf life of the food product derived from the animal is extended. For example, in the case of cattle, it has been found that the shelf life of the beef derived from the cattle may be extended from a conventional three to seven days to ten to fourteen days with an ethoxyquin concentration in the feed of from about 25 to 1,000 ppm by weight or more, preferably from about 50 to about 500 ppm by weight, more preferably from about 50 to about 200, even more preferably from about 100 to about 200 ppm by weight, and optimally from about 100 to about 150 ppm by weight. These concentrations are based on the weight of feed in terms of dry feed intake, as is standard in the industry for referring to concentration. The particular optimum level of ethoxyquin depends in part on the type of feed, with, for example, high vegetable oil level feed requiring higher levels of ethoxyquin. Surprisingly, the ranges of ethoxyquin concentrations found most desirable for the present method falls between the ethoxyquin concentrations typically employed for preservation of feed (up to, perhaps, 1,000 ppm by weight in the fat, which in turn ordinarily makes up about 5% of the feed, corresponding to an ethoxyquin concentration in the feed of up to about 50 ppm by weight) and the ethoxyquin concentration called for in practicing the method of the Canadian Patent No. 2,087,792 (0.05% to 0.1%, which corresponds to 500 to 1,000 ppm by weight). Not only that, but the optimal range, particularly 100 to 150 ppm by weight, is well suited to the concentrations already permitted by the U.S. Food and Drug Administration, which limits use of ethoxyquin as a preservative in animal feeds to a maximum concentrations up to 150 ppm by weight.

By adding the ethoxyquin to the feed shortly prior to feeding as discussed above, the apparent disappearance of ethoxyquin, perhaps due to oxidation, may be able to be avoided. Thus, the desired ethoxyquin concentrations are not just initial concentrations in the feed, but in the preferred embodiment, the unoxidized ethoxyquin concentration of feed as it is ingested by the animal.

It is believed that the concentrations of ethoxyquin found to be effective with respect to cattle may be employed with other animals with similar results. Moreover, it is believed that the preferred ranges found with cattle, and particularly the optimum range, would be desirable for other animals as well. To the extent optimal dosages vary from species to species, however, optimization may be readily ascertained by those of ordinary skill in the art.

The ethoxyquin may be used as the sole shelf life enhancement aid, or it may be used in tandem with another technique or additive. For example, if desired, the ethoxyquin might be used in combination with Vitamin E, at a relative ethoxyquin to Vitamin E ratio of choice. Alternatively, or in addition, the resulting food product may be treated. For instance, potassium sorbate may be added to meat to inhibit bacterial spoilage.

The ethoxyquin treatments preferably are applied during the finishing stage of the animal; that is, during the last period prior to slaughter. The treatment should be continued for a length of time sufficient for the resulting meat product to have an increased shelf life. It has been found that about 21 days is sufficient, but a treatment period of at least about 28 days is preferable. The treatment can be continued for as long as desired, but generally for meat products, treatment would not extend more than about 150 days.

The resulting meat product has been found to have an extended shelf life, and at a fraction of the cost of Vitamin E treatment. For example, ground beef may have a shelf life of ten to fourteen days as opposed to three to four days for ground beef from untreated cattle. Similarly, it is believed that increases in shelf life would be associated with other meats and dairy products as well. In addition, beef treated by the method of this invention has been found to appear younger than the meat from cattle of the same age, but untreated. This provides an additional significant advantage, as it allows desirable younger-colored beef to be obtained from chronologically older cattle. While not wishing to be bound to any particular theory, it is believed that this effect may be associated with the anti-oxidant nature of ethoxyquin, which may retard the aging process. Thus, it is believed that similar slowing of the aging process would be imparted to other animals receiving the treatment of this invention as well.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples, all percentages are given on a weight basis unless otherwise indicated.

EXAMPLE 1

A preliminary study on Vitamin E was conducted. Ninety-six steers (about 330 kg initially) were fed for 145 days diets comprising high moisture corn plus ground alfalfa. The cattle and diets were very similar to those of many commercial feedlots in the southern Great Plains. Once each day, the diet was top-dressed with a corn-Vitamin E supplement that provided either 100 IU or 300 IU Vitamin E daily for each of the eight steers in each pen. Rate and efficiency of gain tended to be greater with the higher level of Vitamin E. Rib sections from these steers were recovered and placed in vacuum packages, and transported to another location. Conventionally, it is recognized that vacuum packaging tends to forestall discoloration to a limited degree. After aging the rib sections in vacuum for fourteen days, they were sliced into steaks and one ribeye steak from each animal was exposed under continuous cool white light in a display case for fourteen days. Color and percentage discoloration (greying) were visually scored each day. The results were as follows:

| DAY | DISCOLORATION (% OF SURFACE) | |
|---|---|---|
| | 100 IU/DAY | 300 IU/DAY |
| 1 | 0 | 0 |
| 2 | 0 | 0 |
| 3 | 2 | 1 |
| 4 | 4 | 1 |
| 5 | 15 | 5 |
| 6 | 55 | 30 |
| 7 | 80 | 60 |
| 8 | 95 | 85 |
| 9 | 95 | 90 |
| 10 | 95 | 90 |

On days 4–8, the percentage of discolored colored meat was significantly lower for steers fed the higher amount of Vitamin E. Much of the exposed surface became grey and discolored with either level of Vitamin E by day 9 of display.

EXAMPLE 2

In another study similar to that described in Example 1, above, ribeye steaks and ground beef from cattle fed with feed containing 150 ppm ethoxyquin for 28 days immediately prior to slaughter and from control cattle were wrapped in plastic and held in display cases. They were scored daily by a team of assessors for color (8=cherry red, 1=brown) and the scores averaged, with the following results:

| Display Time | Steak Color Score | | | Ground Beef Color Score | | |
|---|---|---|---|---|---|---|
| (Days) | Control | EQ* | Prob** | Control | EQ* | Prob** |
| 0 | 7.04 | 6.99 | 0.5675 | 6.50 | 6.50 | 1.000 |
| 1 | 7.12 | 6.94 | 0.0586 | 7.29 | 6.58 | 0.0002 |
| 2 | 5.94 | 6.20 | 0.0266 | 4.54 | 6.21 | 0.0001 |
| 3 | 5.79 | 6.02 | 0.0808 | 4.77 | 6.09 | 0.0001 |
| 4 | 5.45 | 5.74 | 0.0725 | 3.98 | 5.67 | 0.0001 |
| 5 | 5.16 | 5.58 | 0.0140 | 3.60 | 5.63 | 0.0001 |
| 6 | 4.97 | 5.33 | 0.0386 | 3.02 | 5.25 | 0.0001 |
| 7 | 4.62 | 4.99 | 0.0449 | 2.33 | 5.17 | 0.0001 |
| 8 | 4.13 | 4.59 | 0.0516 | 1.52 | 4.65 | 0.0001 |
| 9 | 3.43 | 3.83 | 0.1039 | | | |

*Ethoxyquin treated
**Probability

EXAMPLE 3

One group of cattle was fed with feed containing 150 ppm ethoxyquin for 28 days immediately prior to slaughter, and a control group was fed an identical diet, but without ethoxyquin added. Their daily intake and weight gain were monitored. Over the total length of the study (139 days), the average daily feed of the control group was 21.4 lbs., while that of the group receiving ethoxyquin was 21.2 lbs, and the average weight gain of the control group was 4.19 lbs., while that of the group receiving ethoxyquin was 4.24 lbs. Thus, the ratio of feed to gain was 5.12 for the control group, but only 5.02 for the ethoxyquin group. However, the difference in diets occurred only during the last 28 days, so the differences are muted by consideration of the entire 139 days, the first 111 of which involved no difference between the groups. An analysis of the last 35 days, therefore, clarifies the difference: the average daily feed of the control group was 22.7 lbs., while that of the group receiving ethoxyquin was 22.3 lbs, and the average weight gain of the control group was 4.51 lbs., while that of the group receiving ethoxyquin was 4.75 lbs. Thus, the ratio of feed to gain over the final 35 days was 5.06 for the control group, but only 4.72 for the ethoxyquin group; an efficiency increase of 7.2%.

EXAMPLE 4

In another trial similar to that of Example 3, above, in the first 105 days of the 139 day trial, the average daily weight gain of the control group and the group to receive ethoxyquin (it was not fed to either group of cattle in the first 105 days) was essentially identical as would be expected: 3.8 lbs. and 3.78 lbs., respectively. Over the final 34 days, however, the average daily weight gain of the control group was only 3.16 lbs., compared to 3.44 lbs. for the group receiving ethoxyquin. The carcass effects were as follows:

| | Control | Ethoxyquin | % Difference |
|---|---|---|---|
| Dressing (%) | 61.4 | 61.5 | 0.2 |
| Rib eye area (%) | 13.9 | 13.6 | -2.2 |
| Lean maturity | 153 | 142 | -7.2 |
| Skeletal maturity | 153 | 153 | 0 |
| Marbling score | 285 | 341 | 19.6 |
| Rib fat thickness (in.) | 0.43 | 0.50 | 14.0 |
| KPH fat (%) | 2.17 | 2.26 | 4.0 |
| USDA yield grade | 2.27 | 2.67 | 15.0 |
| Final yield grade | 2.64 | 2.88 | 8.3 |
| Liver abscesses (%) | 6.7 | 4.5 | -33.3 |
| weight (lbs.) | 760 | 764 | |

EXAMPLE 5

Odor offensiveness of cattle feces was graded (on a scale from 1, representing least offensive, to 10, representing greatest offensiveness) by a team of assessors at six and thirty hours of age for control cattle and ethoxyquin-fed cattle. At six hours, the average score of the control cattle feces was 5.19, and for the ethoxyquin-fed cattle was 4.19. At thirty hours, the average score of the control cattle feces was 5.17, and for the ethoxyquin-fed cattle was 5.00.

In view of the above, it will be seen that the several advantages of the invention are achieved and other advantageous results obtained.

As various changes could be made in the above methods and compositions without departing from the scope of the invention, it is intended that all matter contained in the above description shall be interpreted as illustrative and not in a limiting sense.

What is claimed:
1. A method for extending the shelf life of a meat product derived from an animal selected from the group consisting of ruminant mammals, swine and fish, comprising feeding to the animal a diet of feed comprising a substituted 1,2-dihydroquinoline compound of the formula

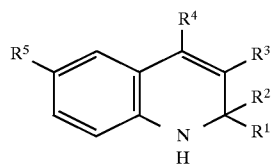

wherein $R^1$, $R^2$, $R^3$ and $R^4$ are independently selected from the group consisting of hydrogen and alkyl groups of from 1 to about 6 carbon atoms, and $R^5$ is an alkoxy group of from 1 to about 12 carbon atoms, the diet being continued for a period of time, and the feed comprising the substituted 1,2-dihydroquinoline compound in an amount, sufficient to increase the shelf life of the meat product.

2. A method as set forth in claim 1 wherein the substituted 1,2-dihydroquinoline compound is 6-ethoxy-1,2-dihydro-2,2,4-trimethylquinoline.

3. A method as set forth in claim 2 wherein the feed comprises greater than 50 ppm by weight 6-ethoxy-1,2-dihydro-2,2,4-trimethylquinoline.

4. A method as set forth in claim 3 wherein the feed comprises at most about 1,000 ppm by weight 6-ethoxy-1,2-dihydro-2,2,4-trimethylquinoline.

5. A method as set forth in claim 3 wherein the feed comprises from about 100 ppm by weight to about 1,000 ppm by weight 6-ethoxy-1,2-dihydro-2,2,4-trimethylquinoline.

6. A method as set forth in claim 4 wherein the feed comprises from about 100 ppm by weight to about 200 ppm by weight 6-ethoxy-1,2-dihydro-2,2,4-trimethylquinoline.

7. A method as set forth in claim 2 wherein the animal is selected from the group consisting of ruminant mammals and swine.

8. A method as set forth in claim 7 wherein the animal is selected from the group consisting of ruminant mammals.

9. A method as set forth in claim 8 wherein the animal is selected from the group consisting of cattle and sheep.

10. A method as set forth in claim 9 wherein the animal is cattle and the meat product is beef.

11. A method as set forth in claim 10 wherein the beef has a shelf life of at least about ten days.

12. A method as set forth in claim 10 wherein the diet is maintained during the finishing period of the cattle and the period of time is at least about 21 days.

13. A method as set forth in claim 12 wherein the diet is maintained during the finishing period of the cattle and the period of time is at most about 150 days.

14. A method as set forth in claim 2 wherein the feed further contains vitamin E.

15. A method as set forth in claim 2 wherein the feed is prepared by mixing together a plurality of ingredients, including at least one non-fat ingredient and adding 6-ethoxy-1,2-dihydro-2,2,4-trimethylquinoline to all of the ingredients, including the non-fat ingredients.

16. A method as set forth in claim 15 wherein the 6-ethoxy-1,2-dihydro-2,2,4-trimethylquinoline is added to the ingredients while the ingredients are being mixed together.

17. A method as set forth in claim 15 wherein the 6-ethoxy-1,2-dihydro-2,2,4-trimethylquinoline is added to the ingredients after the ingredients have been mixed together.

18. A method as set forth in claim 17 wherein the feed is fed to the cattle within one day of the addition of the 6-ethoxy-1,2-dihydro-2,2,4-trimethylquinoline.

19. A method as set forth in claim 18 wherein the feed is fed to the cattle within two hours of the addition of the 6-ethoxy-1,2-dihydro-2,2,4-trimethylquinoline.

20. A method as set forth in claim 15 wherein the feed comprises greater than 50 ppm by weight 6-ethoxy-1,2-dihydro-2,2,4-trimethylquinoline.

21. A method as set forth in claim 20 wherein the feed comprises at most about 1,000 ppm by weight 6-ethoxy-1,2-dihydro-2,2,4-trimethylquinoline.

22. A method as set forth in claim 20 wherein the feed comprises from about 100 ppm by weight to about 1,000 ppm by weight 6-ethoxy-1,2-dihydro-2,2,4-trimethylquinoline.

23. A method as set forth in claim 22 wherein the feed comprises from about 100 ppm by weight to about 200 ppm by weight 6-ethoxy-1,2-dihydro-2,2,4-trimethylquinoline.

24. A method as set forth in claim 20 wherein the animal is selected from the group consisting of ruminant mammals and swine.

25. A method as set forth in claim 24 wherein the animal is selected from the group consisting of ruminant mammals.

26. A method as set forth in claim 25 wherein the animal is selected from the group consisting of cattle and sheep.

27. A method as set forth in claim 26 wherein the animal is cattle and the meat product is beef.

28. A method as set forth in claim 27 wherein the but has a shelf life of at least about ten days.

29. A method as set forth in claim 26 wherein the diet is maintained during the finishing period of the cattle and the period of time is at least about 21 days.

30. A method as set forth in claim 29 wherein the diet is maintained during the finishing period of the cattle and the period of time is at most about 150 days.

31. A method as set forth in claim 20 wherein the 6-ethoxy-1,2-dihydro-2,2,4-trimethylquinoline is added to the ingredients while the ingredients are being mixed together.

32. A method as set forth in claim 20 wherein the 6-ethoxy-1,2-dihydro-2,2,4-trimethylquinoline is added to the ingredients after the ingredients have been mixed together.

33. A method as set forth in claim 32 wherein the feed is fed to the cattle within one day of the addition of the 6-ethoxy-1,2-dihydro-2,2,4-trimethylquinoline.

34. A beef composition produced by the method of claim 10.

35. A method for improving at least one characteristic of raising animals for slaughter, the characteristic being selected from the group consisting of feed efficiency of the animals, odor of waste excretions of the animals, rate of maturation of the animals, and incidence of liver abscesses in the animals, and the animals being selected from the group consisting of ruminant mammals, swine and fish, the method comprising feeding to the animals a diet of feed comprising a substituted 1,2-dihydroquinoline compound of the formula

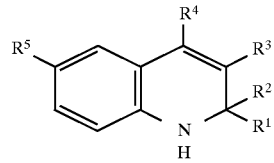

wherein $R^1$, $R^2$, $R^3$ and $R^4$ are independently selected from the group consisting of hydrogen and alkyl groups of from 1 to about 6 carbon atoms, and $R^5$ is an alkoxy group of from 1 to about 12 carbon atoms, the diet being continued for a period of time, and the feed comprising the substituted 1,2-dihydroquinoline compound in an amount, sufficient to improve the at least one characteristic.

36. A method as set forth in claim 35 wherein the substituted 1,2-dihydroquinoline compound is 6-ethoxy-1,2-dihydro- 2,2,4-trimethylquinoline.

37. A method as set forth in claim 36 wherein the feed comprises greater than 50 ppm by weight 6-ethoxy-1,2-dihydro-2,2,4-trimethylquinoline.

38. A method as set forth in claim 37 wherein the feed comprises at most about 1,000 ppm by weight 6-ethoxy-1,2-dihydro-2,2,4-trimethylquinoline.

39. A method as set forth in claim 37 wherein the feed comprises from about 100 ppm by weight to about 1,000 ppm by weight 6-ethoxy-1,2-dihydro-2,2,4-trimethylquinoline.

40. A method as set forth in claim 38 wherein the feed comprises from about 100 ppm by weight to about 200 ppm by weight 6-ethoxy-1,2-dihydro-2,2,4-trimethylquinoline.

41. A method as set forth in claim 36 wherein the animals are selected from the group consisting of ruminant mammals and swine.

42. A method as set forth in claim 41 wherein the animals are ruminant mammals.

43. A method as set forth in claim 42 wherein the animals are cattle.

44. A method as set forth in claim 43 wherein the at least one characteristic is feed efficiency of the cattle.

45. A method as set forth in claim 43 wherein the at least one characteristic is odor of waste excretions of the cattle.

46. A method as set forth in claim 43 wherein the at least one characteristic is rate of maturation of the cattle.

47. A method as set forth in claim 43 wherein the at least one characteristic is incidence of liver abscesses in the cattle.

48. A method as set forth in claim 47 wherein the improvement in the incidence of liver abscesses in the cattle is a reduction in the frequency of absescesses over what is encountered by cattle whose diet does not include the substituted 1,2-dihydroquinoline compound.

49. A method as set forth in claim 47 wherein the improvement in the incidence of liver abscesses in the cattle is a reduction in the severity of absescesses over what is encountered by cattle whose diet does not include the substituted 1,2-dihydroquinoline compound.

50. A method as set forth in claim 43 wherein the diet is maintained during the finishing period of the cattle and the period of time is at least about 21 days.

51. A method as set forth in claim 50 wherein the diet is maintained during the finishing period of the cattle and the period of time is at most about 150 days.

52. A method as set forth in claim 1, wherein the feed is free of added N3 fatty acids.

* * * * *